United States Patent Office 3,553,689
Patented Jan. 5, 1971

3,553,689
TERRAIN AVOIDANCE SYSTEM
Bartow Bechtel, Mountain View, Calif., assignor to Texas Instruments Incorporated, Dallas, Tex., a corporation of Delaware
Filed Dec. 29, 1961, Ser. No. 163,360
Int. Cl. G01s 9/02
U.S. Cl. 343—7                                       18 Claims

ABSTRACT OF THE DISCLOSURE

The present invention relates to radar systems and more particularly to a terrain avoidance system including a precision-shaped scan pattern which may be utilized with manned or unmanned aircraft.

Radar systems which are intended for installation in military aircraft must meet the severe requirement of a high degree of dependability in addition to having relatively low complexity, light weight and small size. Above all, the systems must fulfill their intended functions in all respects with a minimum possibility of failure.

In terrain avoidance systems, the basic consideration is that of maintaining a craft at a prescribed altitude above the terrain or obstacles arising therefrom under all conditions. In order to accomplish this result, the terrain avoidance system must maintain the craft within the prescribed altitude limits over level terrain, detect obstacles in the path of a craft in sufficient time to permit the craft to obtain the desired altitude above the obstacle within a sufficient period of time to prevent undue stressing of structural members of the craft, and after passing an obstacle, return the craft to the proper altitude relative to new conditions. With regard to maneuvers involving minimum stress to the aircraft, the obstacle must be detected in sufficient time that the aircraft's avoidance maneuvers may be maintained in the desired "g" range. The obstacle must be monitored until the obstruction is of no further interest so far as the flight path of the craft is concerned, and the system must locate new obstacles and produce the required responses to them as dictated by the particular terrain encountered. As a result of these requirements, the craft must be able to monitor all obstacles at all times over its entire range of operation. Further, the system must utilize, to the extent possible, existing systems in the craft, these latter requirements varying with whether the craft is a drone or a manned craft. The terrain avoidance system of the invention must be compatible with existing autopilot equipment in drones and in manned aircraft in order to minimize the additional equipment required, and, in the case of manned aircraft, to also minimize the strain on the pilot.

It is an object of the present invention to provide a relatively simple, light weight, and compact terrain avoidance system which is highly dependable and which is completely compatible with the existing equipment employed in drone and manned aircraft.

It is another object of the present invention to provide a terrain avoidance radar system in which an obstruction can be continually monitored and generate the appropriate control action from the time it comes into the range of the radar until it is no longer of any interest with regard to the safety of the craft.

It is still another object of the present invention to provide a terrain avoidance radar sytem which does not measure angle and range of an obstacle to determine relative altitude but merely detects the presence of the obstacle and programs a climb to the craft until the craft is on a flight vector which assures that the obstacle passes below the craft by a preselected altitude. The steady state angle of climb programmed is proportional to the height of the obstacle.

It is another object of the present invention to provide a terrain avoidance radar system which is completely compatible with existing autopilot systems.

It is yet another object of the present invention to provide a terrain avoidance radar system which may continually monitor its own operability.

It is yet another object of the present invention to provide a terrain avoidance radar system for manned craft in which the pilot is immediately informed of a malfunction of the radar.

It is another object of the present invention to provide a terrain avoidance radar system in which the system is continually monitored and in which a descent cannot be programmed where there is a failure of return signals to the radar antenna.

It is another object of the present invention to provide a terrain avoidance radar system in which information concerning obstacles is available in sufficient time before the aircraft approaches the obstacle that low "g" avoidance maneuvers may be employed.

It is yet another object of the present invention to provide a terrain avoidance radar system for utilization in manned aircraft wherein the system will provide aural and/or visual signals to define the proper vertical flight path to the pilot or which may be employed in conjunction with the autopilot to provide for automatic control of the flight of the aircraft at a predetermined altitude.

Other and further objects, advantages and characteristic features of the present invention will become readily apparent from consideration of the following detailed description of preferred embodiments of the invention when taken in conjunction with the appended drawings in which.

Figure 1:
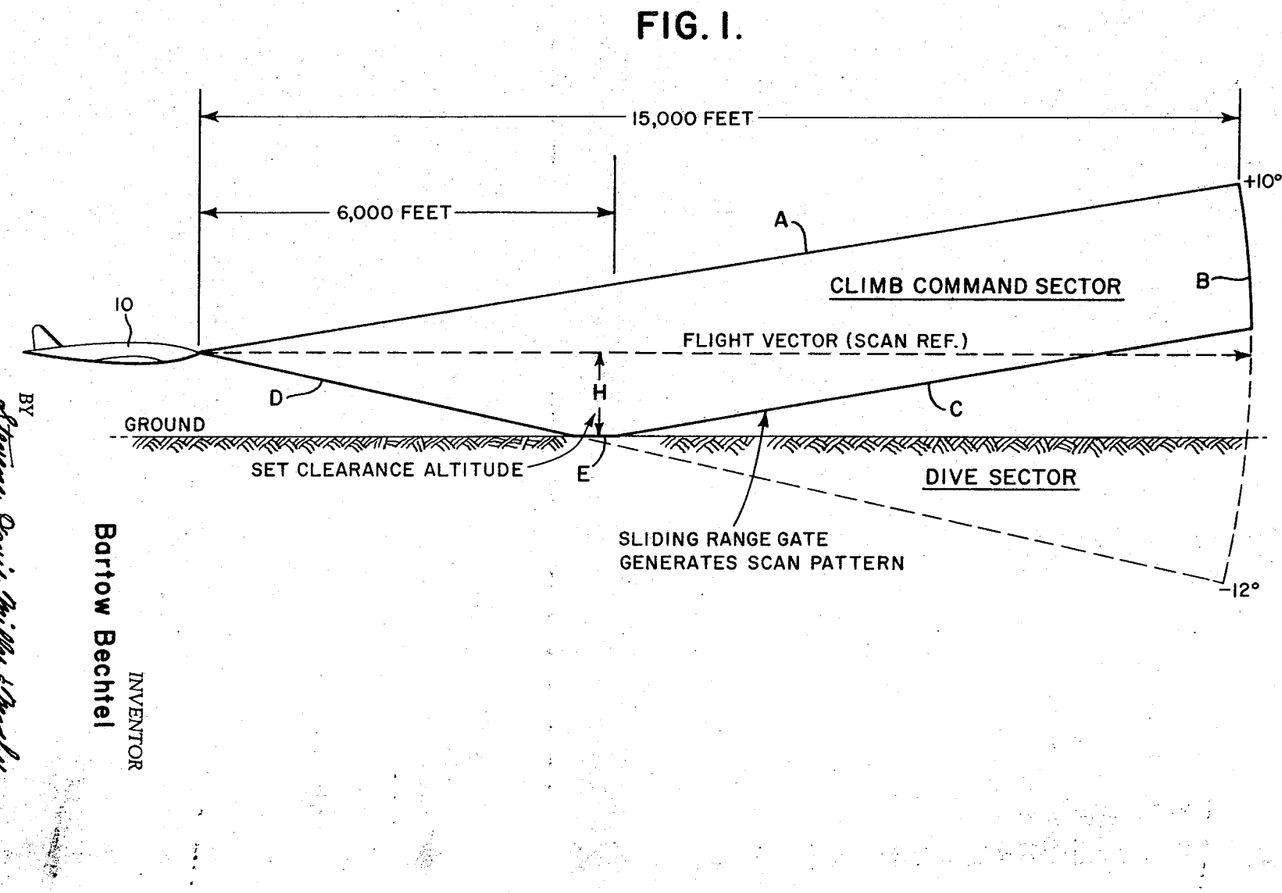
FIG. 1 is a vertical profile diagram illustrating the profile (or template) scanned by the radar antenna of the system of the present invention.

Referring specifically to FIG. 1 of the accompanying drawings, there is illustrated a diagram which will be employed to describe the basic functioning of the system. An aircraft 10, and in this particular embodiment of the invention the aircraft is taken to be a drone, is to be maintained by the system of the invention essentially at a predetermined altitude H above the surface of the surrounding terrain. The aircraft is provided with an antenna for transmitting and receiving pulses of electromagnetic energy. The antenna transmits pulses at a predetermined repetition rate which, for purposes of illustration, is stated to be 4.0 kilocycles per second. The antenna is swept through a predetermined vertical angle, of for instance 22° (from 10° above the flight vector of the craft to 12° below it) by a vertical scan drive 18 shown in FIG. 2. The antenna scan is referenced or stabilized to the flight vector of the craft. Stabilization of the system is accomplished by displacing the normal alignment of the scan relative to the flight vector angle $\gamma$ proportionally to the rate of change $\dot\gamma$ of the flight vector angle $\gamma$ the airplane is experiencing. This compensating scan-alignment adjustment is carried out by measuring the rate of change $\dot\gamma$ of the flight vector angle $\gamma$ with a rate gyro 28 and inserting the measured $\gamma$ into the appropriate pitch servo 20 of the scanning antenna. The rate gyro 28 is a standard gyro commonly used in tracking systems.

The antenna moves through a complete scan cycle, i.e., it moves from its upper limit to its lower limit and then back to its upper limit of movement at a predetermined rate, which for purposes of example is taken to be one cycle per second. Thus, the antenna scans a predetermined sector in front of the craft twice each second, once on its downward movement and again during its upward movement. Since the repetition rate of the pulses transmitted by the antenna is 4000 c.p.s. and the antenna sweeps through a 22° angle in one-half of a second, a pulse is transmitted every .011° of movement of the antenna beam. This is more than adequate to provide complete coverage of the sector defined by the vertical movement of the antenna.

As previously mentioned, it is desired to maintain the aircraft at essentially an altitude H above the highest object in the surrounding terrain. In practice, the altitude H (termed the set clearance altitude) would vary between about 200 feet and 1500 feet.

The scan profile is shown in FIG. 1. The upper limit of the profile is determined by a line A extending from the aircraft 10 at a predetermined angle (e.g. 10°) above the flight vector of the aircraft. The extent of the scan is determined by a line B which intersects line A and which is disposed perpendicular to the flight vector of the aircraft a given distance (e.g. 15,000 feet) ahead of the aircraft. The lower limit of the scan is defined by three lines. Line C which intersects line B at a point slightly above the flight vector of the aircraft, is disposed at a relatively small angle with respect to the flight vector of the aircraft and extends from line B almost parallel to line A until it intersects the ground at a given distance (of, for example, 6,000 feet) in front of the aircraft. Line D extends from the aircraft at a predetermined angle (e.g. 12°) below the flight vector. The line E, which runs along the ground, joins the points where the lines C and D intersect the ground to complete the scan profile.

The line C will be referred to as the sloping front of the scan and is controlled by a variable range gate to be discussed later. The area enclosed between line A, arc B, line C, line D, and line E is termed the Climb Command Sector, and if the radar locates any object in this sector, a command is generated for the aircraft to climb. If no objects are detected in the Climb Command Sector, but objects are detected below the line C and within range of the radar, a command is given for the aircraft to dive or descend. If no objects at all are detected by the radar, a signal is generated to indicate a possible failure or malfunction of the system.

Figure 4:
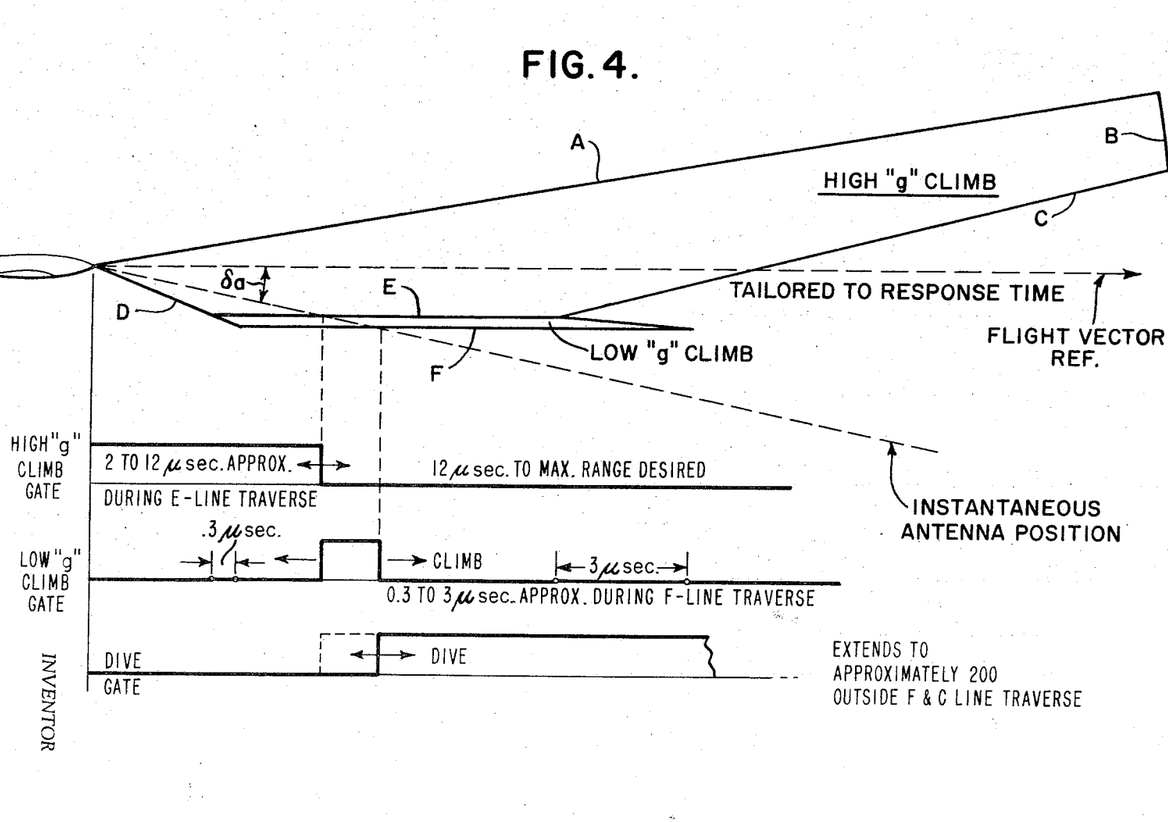
FIG. 4 is a profile diagram similar to FIG. 1 which includes the low "g" climb sector and which also illustrates the gating waveforms used in the system as related to the various sectors of the scanning profile.

As illustrated in FIG. 4 and as will be discussed in more detail later, the Climb Sector suitably includes two sectors, the upper sector being termed the High "g" Climb Sector and the lower sector being designated as the Low "g" Climb Sector. If an object is detected in the High "g" Climb Sector, a command to initiate a steep climb (i.e., to increase the angle of the flight vector at a relatively large rate) will be given. For obstacles detected in the Low "g" Climb Sector, a mild or gradual climb command will be generated to increase the angle of the flight vector at a relatively small rate.

The operation of the system of the present invention may be briefly described by using as an example a flight over level terrain with a vertical obstacle in the path of the aircraft. Assume that the aircraft is initially flying over level terrain with signals occurring (due to returns from the ground) only in the lower region of the Climb Sector or in the Dive Sector. Also, let it be assumed that at the instant designated as time zero, the aircraft has an altitude of zero flight vector angle $\gamma$ and zero values for the first two derivatives ($\dot{\gamma}$ and $\ddot{\gamma}$) of the flight vector angle. Also, assume that the aircraft altitude is slightly larger than the set clearance altitude H. Thus, there will be no returns in the Climb Sectors for at least a complete radar scan, and a dive command is issued. The aircraft responds to this command, and the flight vector begins to rotate downward.

Since the scan is stabilized to flight vector and corrected as a function of the $\dot{\gamma}$, the dive command is continued until the combined effects of $\gamma$, $\dot{\gamma}$, and reduction in altitude cause the scan to intersect the ground. Immediately thereafter, a climb command is generated. Since the value of $\gamma$, $\dot{\gamma}$, and $\ddot{\gamma}$ are no longer zero, the flight vector will continue to depress slightly until the autopilot-airframe system integrates the climb signal to produce a change in $\gamma$ sufficient to overcome the negative angle. The rapidity with which the aircraft system does this depends on the response characteristics of the autopilot-airframe system. The climb command is held until the combined effects of $\gamma$, $\dot{\gamma}$ and altitude elevate the scan such as to receive no returns in the Climb Sectors. The dive command is given, and the process is then repeated. Since the oscillation is a function of three variables, all of which are of a corrective phase, the overshoots and undershoots are of a low value, and the altitude is maintained essentially constant.

As the vertical obstacle is detected within range, a climb signal is immediately given and held until the obstacle no longer appears in the Climb Sector. In this way the aircraft is guided into a climbing attitude along a profile governed by the shape of the scan. As the aircraft nears the obstacle, the lower limit of the scan angle and the climbing attitude of the craft clear the climb sector of return, and a push-over maneuver is begun. Since the scan is corrected by $\dot{\gamma}$, the scan is displaced downward by the maneuver, and the ground plane is again detected soon after the maximum altitude is attained. During the descent the aircraft is directed in a manner similar to that used in obstacle approach. As the aircraft nears the ground, level flight at the correct clearance altitude is resumed.

Figure 2:
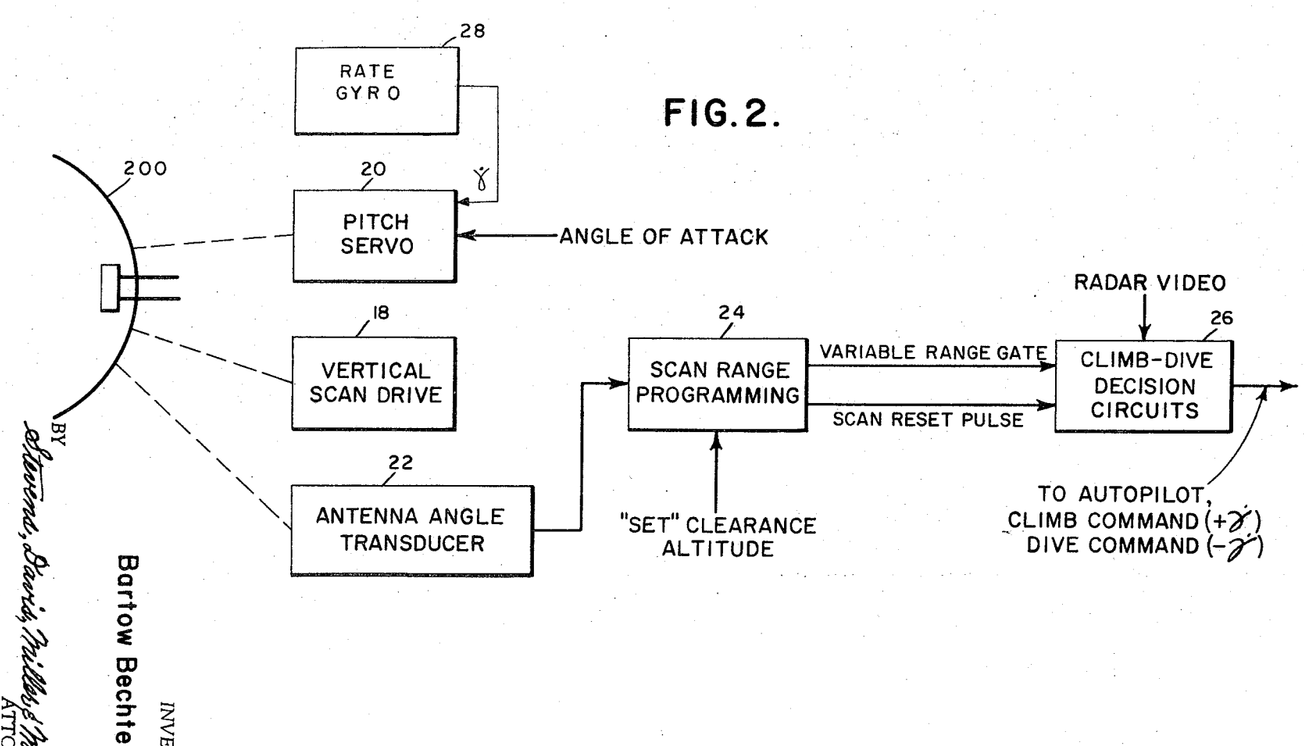
FIG. 2 is a simplified block diagram of the system of the invention.

A simplified block diagram of the system of the present invention is given in FIG. 2. The angle of attack of the aircraft is measured by suitable instruments (not shown) and fed to an antenna pitch servo 20. A signal indicative of the antenna scan angle is sent through an antenna angle transducer 22 to scan range programming circuitry 24 which also receives a programmed set clearance altitude command. The programming circuitry sends signals to the climb-dive decision circuits 26 which receive the video signals picked up by the antenna. The decision circuits generate the climb and dive commands which are sent to the autopilot. The control system always commands the airplane to execute its maximum rate of response when a climb or dive command is given. Since the autopilot-aircraft system integrates the autopilot-input signals to obtain the flight vector angle $\gamma$, the terrain clearance autopilot command unit may supply the derivative $\dot{\gamma}$ of the flight vector. The value of $\dot{\gamma}$ is selected which, if maintained for sufficient time, will produce a vertical maneuver generating but not exceeding the desired number of "g's" assigned to the vertical maneuver. It should be pointed out that with this system the average value of the acceleration is very low.

Figure 3A:
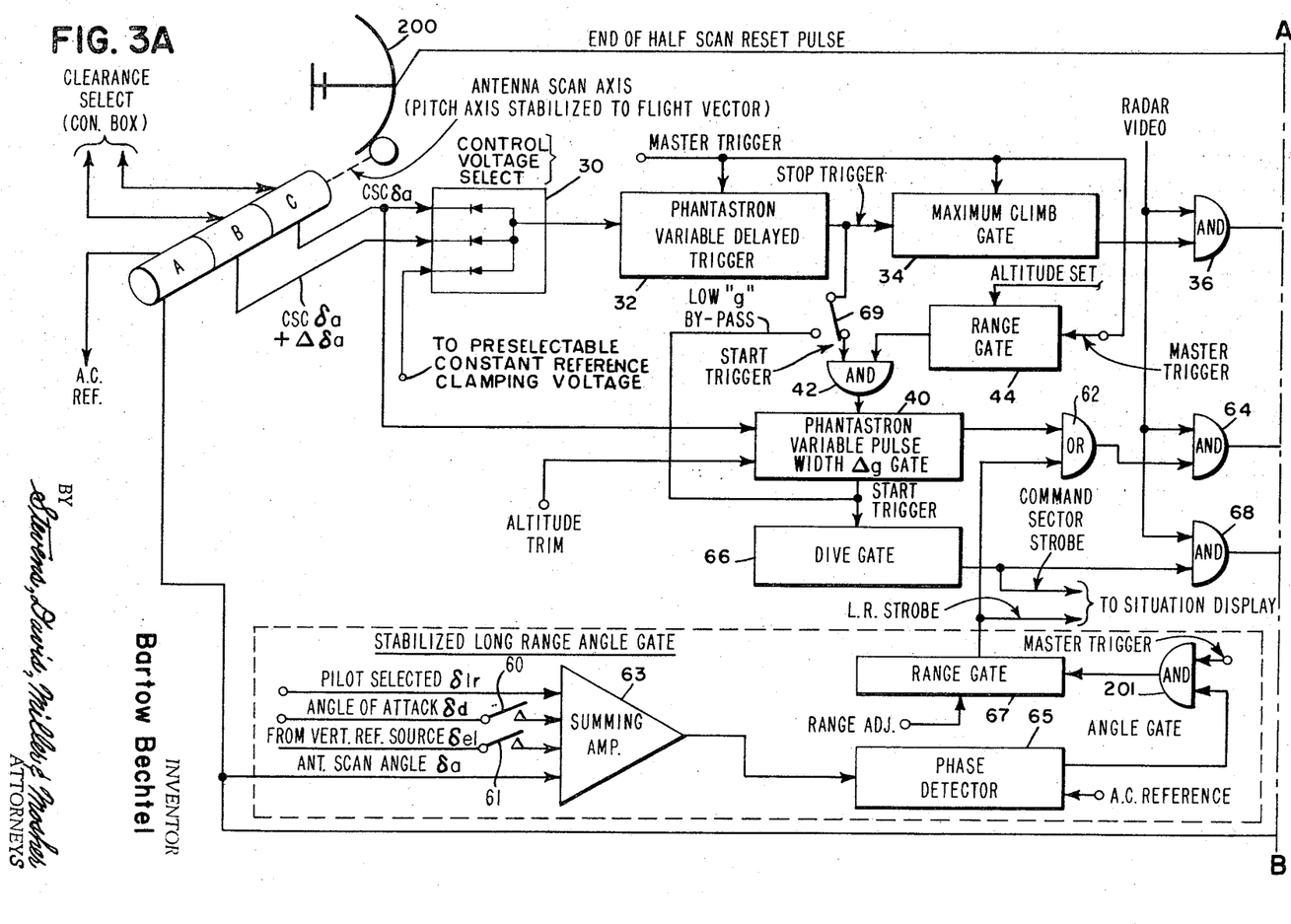
FIGS. 3a and 3b are block diagrams which illustrate the system in greater detail.
Figure 3B:
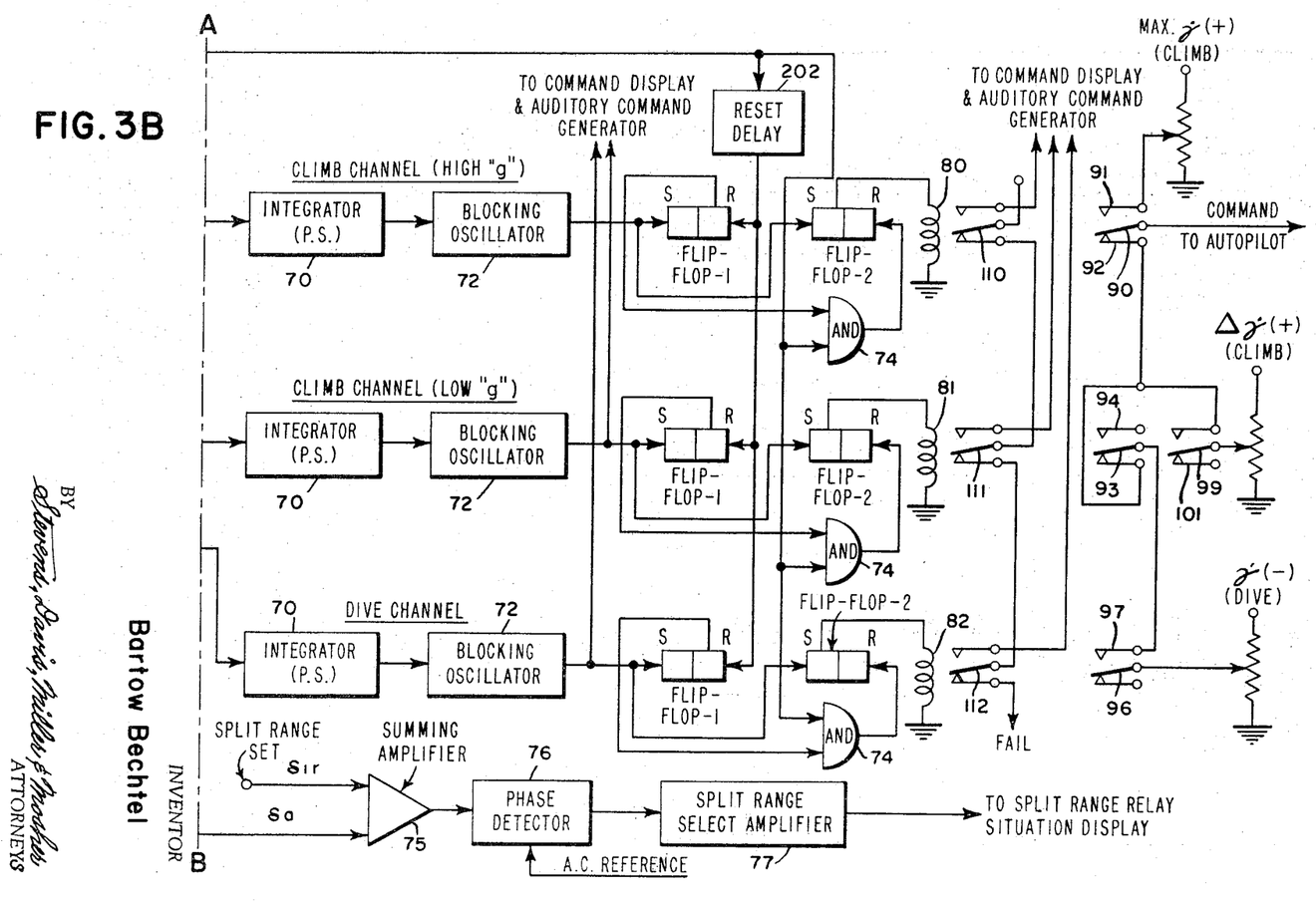

A more detailed block diagram of the system is shown in FIGS. 3a and 3b. However, in discussing the operation of the system it is helpful to define the following quantities:

$\delta el$ = airframe axis to the horizontal
$\delta d$ = angle of attack of aircraft
$\delta a$ = antenna position relative to the flight vector
$\delta lr$ = long range angle gate to the flight vector.

Figure 5:
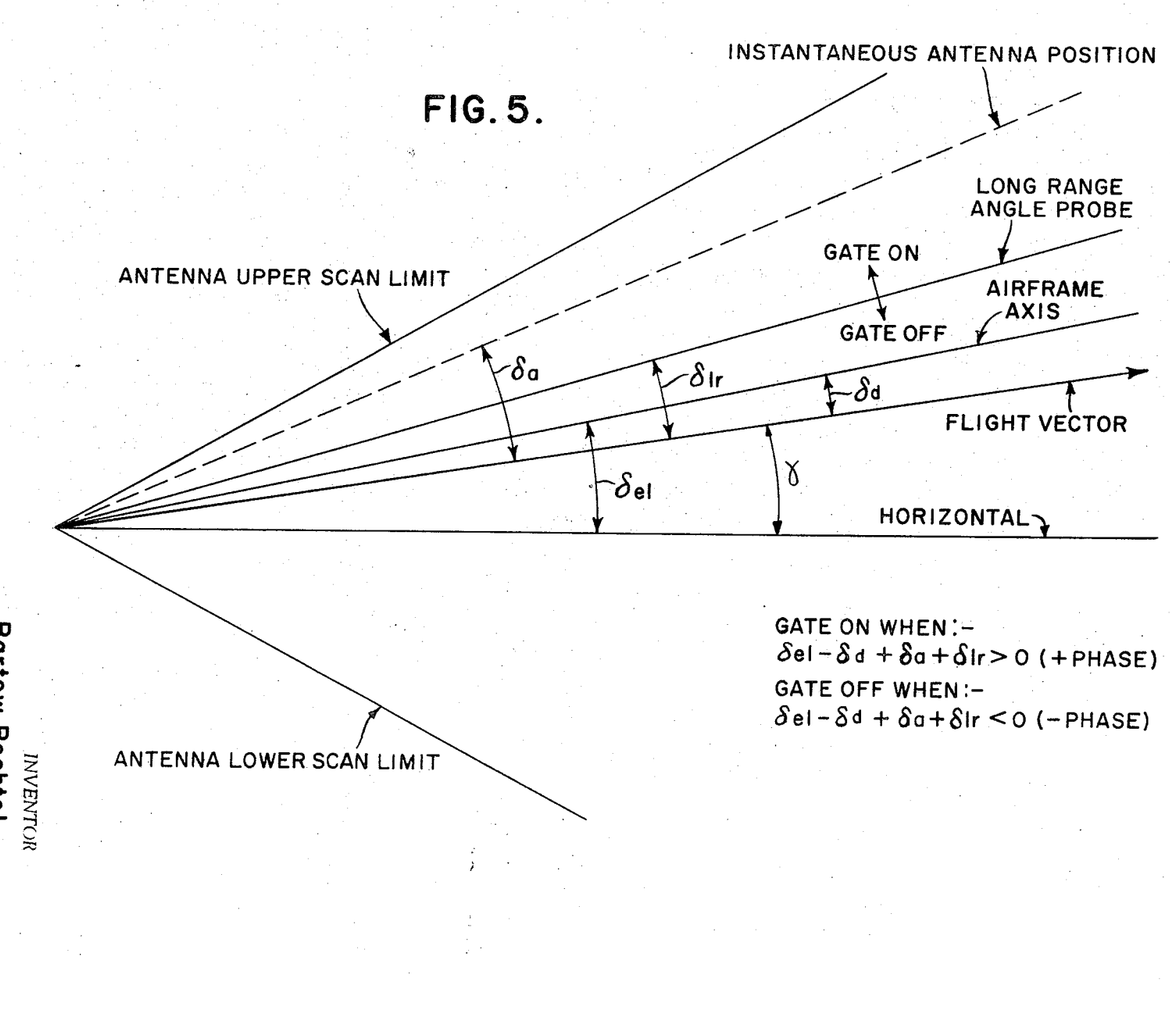
FIG. 5 illustrates the angle gating logic for the long-range sector when stabilized to the horizontal.
Figure 6:
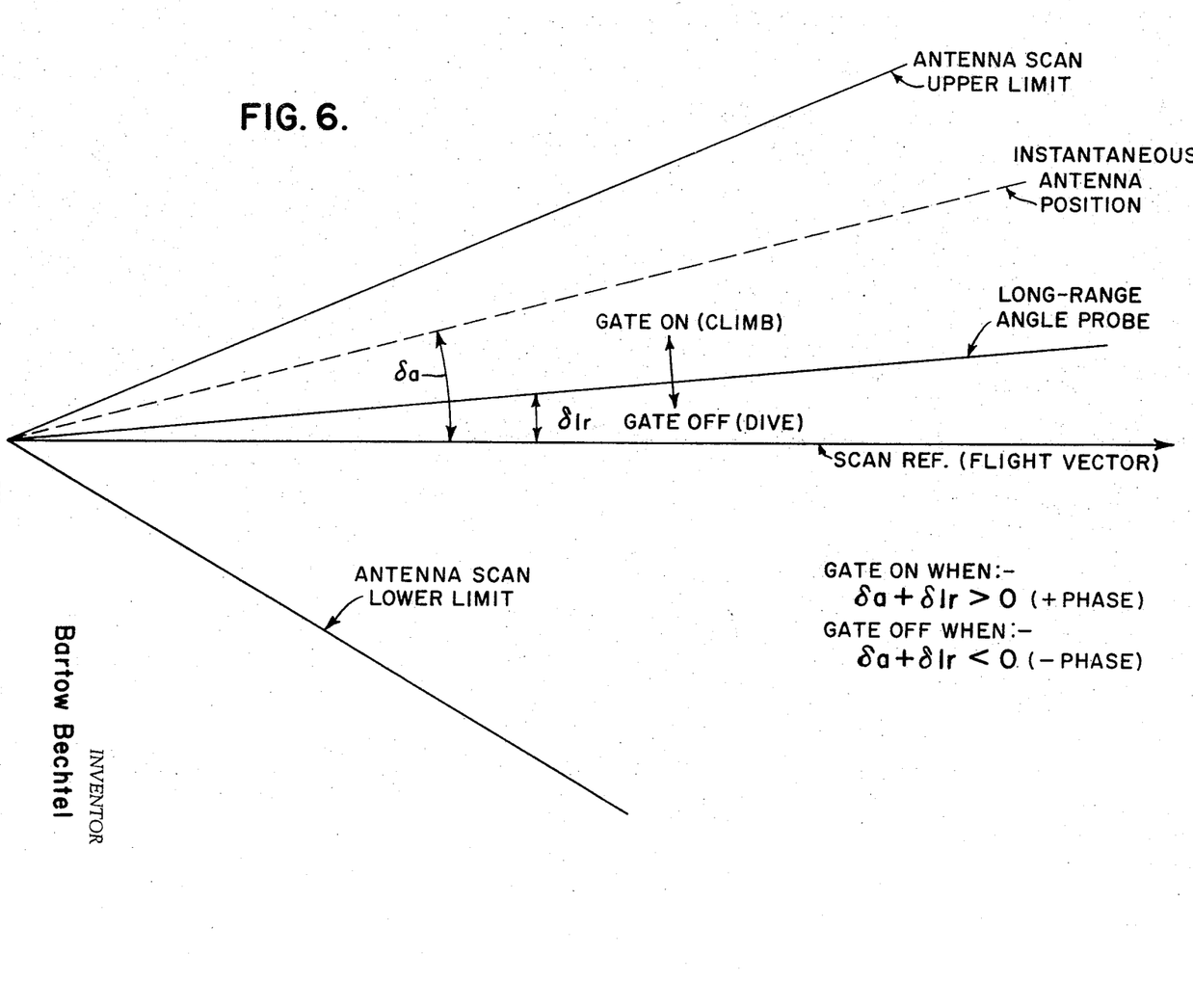
FIG. 6 illustrates the angle gating logic for the long-range sector when stabilized to the flight vector.

A diagrammatic representation for these quantities is given in FIGS. 5 and 6.

Returning now to FIGS. 3a and 3b, the signals representative of the direction in which the antenna 200 is pointing are fed through a Control Voltage Select circuit 30 to a Phantastron Variable Delayed Trigger circuit 32. The precision shaped scan pattern (Climb Sector) is generated by the Phantastron circuit, utilizing a clamping voltage from the Control Voltage Select circuit which is a function of the antenna angle. During the uppermost portion of the precision shaped scan (i.e., before extremity of the scan reaches the point of intersection of arc B and line C) the Control Voltage Select circuit provides a preselectable constant reference clamping voltage to the plate of the Phantastron circuit. This creates the curve-shaped scan arc B. However, when the extremity of the precision-shaped scan is traversing the line E between line D and C, the Control Voltage Select circuit provides to the Phantastron circuit a second input which is a variable clamping voltage being generated as a cosecant function of antenna angle $\delta a$, thereby creating the desired slope for line E of the scan pattern. This voltage is designated as CSC $\delta a$ in FIG. 3a. As the extremity of the precision-shaped scan is traversing line C between line E and arc B, the Control Voltage Select circuit provides a third input to the Phantastron circuit which is a variable clamping voltage being generated as a cosecant function of antenna angle $\delta a$ displaced by a preselectable antenna angle $\Delta \delta a$. This voltage is designated as CSC $\delta a + \Delta \delta a$ in FIG. 3a.

As a preferred embodiment of the Control Voltage Select circuit, three diodes are utilized to provide clamping voltages to the plate of the Phantastron (a suitable Phantastron circuit is described at pages 470–471 in Reference Data for Radio Engineers, 4th edition, by International Telephone and Telegragh Co.). In the Select circuit one diode has its cathode connected to a preselectable constant reference clamping voltage source, a second diode has its cathode connected to a voltage source which is the cosecant function of the radar antenna angle and a third diode has its cathode connected to a voltage source which is the cosecant function of the radar antenna angle displaced by a preselectable constant antenna angle. The plates of all three diodes are connected to the plate of the Phantastron tube. The diodes clamp the Phantastron plate to a voltage level which represents the lowest cathode potential of the diodes.

In this manner the range of the precision-shaped scan profile is maintained constant during the scan of arc B, linearly decreasing during the scan of line C from arc B to line E, and linearly decreasing during the scan of line E from line C to line D.

It should be appreciated that other means to provide a control voltage to the Phantastron circuit to create the appropriate precision-shaped scan profile will be immediately recognized by those skilled in the art.

The output from the Phantastron is sent to three separate channels, namely, a High "$g$" Climb channel, a Low "$g$" Climb channel, and a Dive channel. The Phantastron Variable Delayed Trigger 32 provides a stop trigger to the Maximum Climb Gate 34 which was turned on by the master trigger. This means that the Maximum Climb Gate remains open from the time a pulse is emitted from the radar antenna until the variable trigger from the Phantastron occurs. Thus, the AND Gate 36 to the High "$g$" Climb Channel remains enabled during this period. If radar video occurs during the time the Maximum Climb Gate is open, the radar video will pass through the AND Gate, and thus, operate the decision making portion of the Climb Channels. The Phantastron Variable Delayed Trigger acts as a start trigger for the Phantastron Variable Pulse Width $\Delta g$ Gate 40. To insure that the $\Delta g$ Gate or Low "$g$" command operates only during the period that the radar is scanning line E, and AND Gate 42 is provided with one input being a Range Gate 44 initiated by the master trigger. For the Phantastron Variable Delayed Trigger to pass the AND Gate, the Range Gate must enable the AND Gate. When the start trigger is applied to the Phantastron Variable Pulse Width $\Delta g$ Gate, an output pulse is generated which has a duration depending upon the clamping voltage level set on Phantastron Plate by the cosecant $\delta a$ voltage from potentiometer C illustrated in FIG. 3a. During the existence of this $\Delta g$ Gate an output to the OR circuit 62 is provided which is one input to the Low "$g$" AND Gate 64. Thus the low "$g$" AND Gate is enabled during the period of the $\Delta g$ Gate to pass radar video to the Climb channel (low "$g$"). A second output from the Phantastron Variable Pulse Width $\Delta g$ Gate which is the trailing edge of the $\Delta g$ Gate provides a start trigger to the Dive Gate 66 which enables the Dive channel AND Gate 68 so that during this period of time return pulses of radar video will pass through the AND Gate and activate the Dive Channel in the decision circuit. A Low "$g$" by-pass switch 69 is provided so that the start trigger to the Dive Gate may be taken directly from the Phantastron Variable Delayed Trigger without the operation of the Low "$g$" Climb channel.

From the above it will be recognized that each channel will receive an input only when video information is received due to an obstacle in the associated sector of the scan profile while the antenna is scanning that sector. In other words, there will be an input to the High "$g$" Climb channel only when an object is detected in the sector of the scan profile allotted to generate the High "$g$" Climb command, and similarly, an input will be sent to the Low "$g$" Climb channel only when an object is detected in the Low "$g$" Climb sector with an input signal being applied to the Dive channel only when an object is detected in the Dive sector of the scan profile. The respective waveforms generated by the Climb Gate, the Variable Pulse Width Gate and the Dive Gate, together with the corresponding portions of the scan profile, are illustrated in FIG. 4.

As shown in FIG. 3b, each channel consists essentially of an integrator 70 and a blocking oscillator 72. The output from each channel is sent to a decision circuit which makes the logical decisions based upon the time relationship between the received video information and the Climb and Dive gates. The organization of these decisions is as follows. A climb command will be generated if video information occurs during the High "$g$" Climb gating time regardless of what happens during the other gating times. The Climb command will be retained until the completion of the next half scan of the antenna which has no video in the High "$g$" Climb sector. A half scan is defined as the movement of the antenna either from its most depressed angle to its most inclined angle, or vice versa, i.e. from line A to line D. A Low "$g$" command will be generated when video information appears either during this gating time alone or during both this and the Dive gating times. The Low "$g$" command will be retained until video signals appear in the High "$g$" Climb sector or until the completion of the next half scan of the antenna that has video in the Dive sector only.

A Dive command will be given when video information appears only during the time the Dive gating waveform is on.

The decision making portion of each channel consists of a pair of flip-flops, designated as flip-flop 1 and flip-flop 2. The output from the blocking oscillator is fed to the set inputs of both flip-flops. A signal from the antenna, which occurs at the end of each half scan, is fed to the reset input of flip-flop 1 through reset delay 202. The reset input for flip-flop 2 is taken from an AND Gate 74 whose inputs are the output of flip-flop 1 when "reset" and the reset signal at the end of the half scan. Upon the occurrence of an output signal from the blocking oscillator both flip-flop 1 and flip-flop 2 are "set." However, at the end of each half scan flip-flop 1 will be "reset," while flip-flop 2 would only be "reset" at the end of a half scan in which flip-flop 1 was in the "reset" state. The effect of this arrangement is that once flip-flop 2 is "set," it will remain in this condition until the completion of the next half scan in which no video signals appear in the associated channel.

The "end of half scan reset pulse" is generated by the closing and opening of a microswitch (not shown). The non-precision of the microswitch will cause the "end of half scan reset pulse" to occur slightly before the actual end of the scan by the antenna, and will cause it to open slightly after the antenna has already passed its most depressed angle or its most inclined angle. Because of the inherent nature of the microswitch, the duration of the "end of half scan reset pulse" is relatively long in comparison to the reset transition time of flip-flop 1. Due to this characteristic of the microswitch, reset delay 202 is designed to prevent time coincidence between the "end of half scan reset pulse" and the reset output of flip-flop 1. Without the reset delay 202, both inputs to AND gate 74 would be present and the Climb command to the autopilot would be lost at the end of scan immediately following the first detection of the obstacle in the scan profile. By inserting the reset delay 202, the command signal is maintained until the completion of the next half scan in which no video signals appear in the appropriate channel.

The outputs of flip-flops 2 for the respective channels are connected to relay coils 80, 81 and 82, respectively, so that each coil is energized only when the associated flip-flop 2 is in the "set" condition. The relay coils govern the settings of the relay contact arms for the Low "g" Climb, High "g" Climb and Dive channels.. The contacts of the relays are connected in such a manner that mutually exclusive outputs on the command signal lines are provided. Thus, when the High "g" Climb relay arm 90 contacts the upper contact 91 (which will occur when the relay coil 80 is energized), a High "g" Climb command will be sent to the autopilot. When the coil 81 of the Low "g" Climb channel is energized, however, the relay arm 93 will be made to engage contact 94, and if at the same time the relay arm 90 engages contact 92 in the High "g" Climb channel (which means the High "g" Climb, channel is not energized), a Low "g" Climb command will be sent to the autopilot. Similarly, if the Dive relay coil 82 is energized when the relay arm 90 rests against contatct 92 and relay arm 99 engages contact 101 (which means that no signals were present in either of the Climb sectors) the relay arm 96 will be made to contact the contact 97 and a Dive command signal will be sent to the autopilot. In a similar manner relay arms 110, 111 and 112 are operated by relay coils 80, 81 and 82, respectively, to send Low "g" Climb, High "g" Climb, and Dive signals to auditory and visual display means. In the event that no video signals are detected in either the Low "g" Climb sector, the High "g" Climb sector or in the Dive sector, a fail signal is generated and sent to appropriate indicating equipment.

It should be pointed out that in the system of the present invention if two obstacles are encountered within the range of the system, the craft will be caused to climb to an altitude necessary to clear the highest obstacle since the system responds to climb signals once during each scan of the antenna. Therefore, the system's response is the same for each sweep of the antenna regardless of the number of obstacles or the height of the obstacles in the path of the aircraft.

The system heretofore described may be modified to include a warning function which provides information concerning the terrain relatively far in advance of the craft and above the flight path. The pilot may utilize the information relating to terrain and obstacles positioned far in advance of the craft in deciding whether to act on the instructions provided by the climb and descend information or whether to ignore this information and plan a maneuver dictated by the terrain well in advance of the craft.

For the above purpose, stabilized long range angle gating circuitry is provided. This circuitry is enclosed by the dashed lines in the lower left-hand corner of FIG. 3a and is designated as "Stabilized Long Range Angle Gate." The Long Range Angle Gate may be stabilized either to the horizontal or the flight vector. FIG. 5 shows the angle gating logic when the Long Range Sector is stabilized to the horizontal, while FIG. 6 illustrates the angle gating logic when the Long Range Sector is stabilized to the flight vector. The measured input quantities are fed to a summing amplifier 63, with $\delta d$ and $\delta el$, (which are used only when the Long Range Sector is stabilized to the horizontal) being applied to the amplifier through relay arms 60 and 61. In FIG. 3a relay arms 60 and 61 are illustrated as open, which is the case when flight vector stabilization is employed. When the relay arms 60 and 61 are in the closed position, horizontal stabilization would be employed.

The output from the summing amplifier is fed to a phase detector 65, to which there is also applied an A.C. reference signal derived from the antenna. The phase detector output, after being gated with a master trigger in AND gate 201 is sent through a range gate 67 to one of the inputs to OR gate 62 at the input to the Low "g" Climb channel. This introduces the Long Range Climb signal in parallel with the Low "g" Precision Climb signal, which means that a video return signal in either the Precision Scan Climb sector or in the Long Range Climb sector will cause the autopilot to receive the Climb command immediately and result in the programming of a slow climb for the aircraft. It should be noted that the Long Range Climb sector is not operated instead of the Precision Scan profile but rather is operated as a part of the Precision Scan.

The flight vector method of stabilization has the characteristic of guiding the aircraft along a Low "g" flight path with gradually increasing flight vector angle until the precise contour template intersects an obstacle (for example, a mountain) and completes navigation over the obstacle. It has the disadvantage, however, of causing the aircraft to fly in a large climb angle attitude. For lower command inputs the large climb angle attitude approaching the crest of the obstacle causes a larger overshoot. In descent the flight vector type of stabilization causes intersection of the ground soon after peaking and guides the aircraft in a gentle descent. Moreover, the flight vector stabilization has the added advantage of flying peak-to-peak. Use of this method enables the aircraft to maintain altitude between two peaks and not dive after the first peak and climb again to clear the second peak. The angle gate selection feature gives the pilot the ability to lower the angle gate, fly peak-to-peak, and to descend at a low rate; or increase the angle, fly contour, and descend much more rapidly.

The horizontal stabilization method guides the aircraft over the obstacle along a constant angle path corresponding to the set angle gate of the sector. This permits the aircraft to fly a moderate rate of ascent course. As the aircraft approaches the crest, the precise template intersects the peak, and the angle of approach is increased sufficiently for the aircraft to properly clear the obstacle. The climb angle would be such that a reserve of maneuverability is available to combat vertical winds and clear the obstacle adequately. In diving attitude, the horizontal stabilization does not assist in easing the craft to level flight.

Thus, where one method of reference produces an insufficient guidance, the other gives the desired profile; when the features of the two methods of stabilization are combined, the desired overall performance is achieved.

Simultaneous operation of the two methods requires the two sets of the instrumentation shown in the lower left corner of FIG. 3a. The two sectors operate without interference because returns in either sector initiate a Climb command, and the lack of return in both sectors (as well as in the precise navigation template) initiates a Dive command. The flight vector stabilized sector must be set at such an angle that its effect on the precise navigation over low obstacles is negligible in the approach stage. In descent over low obstacles this sector may be used to reduce the dive angle.

An alternate form of operation involves switching between the two sectors. This permits a lower angle gate on the flight vector stabilized sector to be used so that the descent may be made more gradual, and also prevents the sector from having an approach profiles to low terrain. In addition, the use of switching between the Long Range sectors requires only instrumentation for one sector, since all that is required is the opening and closing of the relays 60 and 61.

As is shown in the lower right hand corner of FIG. 3b, the antenna scan angle signal δa and the Long Range Angle Gate input signal δlr are fed to a summing amplifier 75, the output of which is sent through a phase detector 76 referenced to the antenna derived A.C. reference signal for application to a Split Range Select Amplifier. This output from this amplifier 77 is sent to a split range situation display.

In addition to providing automatic control signals for the autopilot, the detected radar information may be employed to provide several different types of visual or aural signals for the pilot. For a visual display, a direct-view storage tube (for example, a Hughes Tonetron 7033 tube) may be used to provide a high intensity display for daylight viewing under high ambient light conditions. One type of display which may be used (and which is especially useful for low altitude precision T/A operation) is the E-presentation. It is also possible to employ a depressed center PPI presentation in which the terrain signals which exist either at the same altitude as the aircraft or above it in the area immediately ahead of the aircraft are displayed.

Thus, it will be apparent that the system provided by the present invention possesses numerous advantages over prior art computing terrain avoidance systems in which the radar supplies range and angle information, computes the relative height of a relative obstacle, and issues an appropriate command based on the aircraft response capabilities. With the system of the present invention, if vertical downward winds suddenly cause the aircraft to accelerate downward, the ground immediately moves into the Climb sector and the aircraft is at once responding to a Climb signal at its maximum rate. Overshoot is minimized because the sloping front of the scan enables the aircraft to return rapidly to its set clearance altitude. Except when obstacles exist, the command signals are generated a very short distance in front of the aircraft so as to make possible very accurate altitude determinations. The system also minimizes the effect of radar noise, since it is not instrumented on a pulse-to-pulse basis, but simply detects signal presence in a short range gate by integrating the video signal plus noise. The enhanced signal is more than adequate to allow the command unit to make a reliable decision as to whether terrain or obstacle signals exist above or below the set clearance altitude. Moreover, the system can detect and measure vertical obstacles and provide suitable indications of them. Safe operation is made possible even though sizable errors may exist in the measurement of the flight vector.

Although the present invention has been shown and described with reference to particular embodiment, nevertheless various changes and modifications obvious to those skilled in the art are deemed to be within the spirit, scope, and contemplation of the invention.

What is claimed is:

1. A terrain avoidance radar system for aircraft, comprising an antenna for transmitting at a predetermined repetition rate pulses of electromagnetic energy to be reflected from bodies in the path of the transmitted pulse energy and for receiving the reflected pulses, means for cyclically moving said antenna through a predetermined vertical angle with respect to the flight vector of the aircraft and at a rate considerably less than the repetition rate of said pulses, means to generate a signal indicative of the vertical scan angle of the antenna, means responsive to said signal indicative of the vertical scan angle to divide the vertical scan profile of said antenna into at least an upper sector, a lower sector and a middle sector, said middle sector being contiguous with said upper and lower sector, means for producing a first electrical signal of a predetermined character when a reflected pulse signal is received by said antenna from at least one object at any point in said upper sector, means for producing a second electrical signal of a different predetermined character when no reflected pulse signals are received by said antenna from objects in said upper sector and said middle sector and a reflected pulse signal is received by said antenna from at least one object at any point in said lower sector, and means for producing a third electrical signal of a third predetermined character when a reflected pulse signal is received by said antenna from at least one object at any point in said middle sector and no reflected pulse signal is received by said antenna from an object in said upper sector.

2. A terrain avoidance radar system according to claim 1 wherein said means for producing a first electrical signal being effective only in response to the receipt of a reflected signal by said antenna from an object within an upper sector defined by a first line extending from said aircraft at a predetermined angle above the flight vector of said aircraft, an arc intersecting said first line and being disposed arcuately to said flight vector a given distance ahead of said aircraft, a second line disposed at a relatively small angle with respect to the flight vector of said aircraft and intersecting said arc at a point slightly above said flight vector, said second line intersecting the ground a predetermined distance in front of said aircraft, a third line extending from said aircraft at a predetermined angle below said flight vector and intersecting the ground, and a fourth line parallel to the ground joining said second and third lines.

3. A terrain avoidance radar system according to claim 2 wherein said means for producing a third electrical signal is effective only responsive to receipt of a reflected signal by said antenna from an object within a middle sector defined by said fourth line, that portion of said third line extending from the intersection of said fourth line to ground, that portion of the fifth line lying between ground and the intersection of said fourth line and said second line, said fifth line extending from said aircraft and passing through the intersection of said second line and said fourth line, and a sixth line lying along the ground and joining the points where said third and fifth lines intersect the ground.

4. A terrain avoidance radar system for aircraft, comprising an antenna for transmitting at a predetermined repetition rate pulses of electromagnetic energy to be reflected from bodies in the path of the transmitted pulse energy and for receiving the reflected pulses, means for cyclically moving said antenna through a predetermined vertical angle with respect to the flight vector of the aircraft and at a rate considerably less than the repetition rate of said pulses, the vertical scan profile of said antenna being divided into at least an upper sector, a lower sector and a middle sector, means for producing a first electrical signal of a predetermined character when a reflected pulse signal is received by said antenna from at least one object at any point in said upper sector, means for producing a second electrical signal of different predetermined character when no reflected pulse signals are received by said antenna from objects in said upper sector and said middle sector and a reflected pulse signal is received by said antenna from at least one object at any point in said lower sector, means for producing a third electrical signal of a third predetermined character when a reflected pulse signal is received by said antenna from at least one object at any point in said middle sector and no reflected pulse signal is received by said antenna from an object in said upper sector, and control means connected to all of said signal producing means, said control means being effective to cause the angle of the flight vector of the aircraft to be increased at a preset relatively large rate in response to the presence of said first electrical signal, to cause the angle of the flight vector of the aircraft to be decreased at a preset rate in response to said second electrical signal, and to cause the angle of the flight vector of the aircraft to be increased at a preset relatively small rate in response to the presence of said third electrical signal.

5. A terrain avoidance system according to claim 4 further including sound producing means connected to said second named means and said third named means, said sound producing means being effective responsive to the presence of at least one of said first and second electrical signals to provide a distinct aural signal for each of said electrical signals present.

6. A terrain avoidance system according to claim 4 further including visual indicator means connected to said second named means and said third named means, said visual indicator means being effective responsive to the presence of at least one of said first and said second electrical signals to provide a distinct visual signal for each of said electrical signals present.

7. A terrain avoidance radar system according to claim 4 further including long range gating means effective to enable said third named means to produce said second electrical signal of different predetermined character responsive to said antenna receiving a reflected signal from an object not within said vertical scan profile and when elevated at a predetermined angle above a reference line.

8. A terrain avoidance radar system according to claim 7 wherein said reference line is a horizontal line.

9. A terrain avoidance radar system according to claim 7 wherein said reference line is the flight vector.

10. A terrain avoidance radar system for aircraft, comprising an antenna for transmitting at a predetermined repetition rate pulses of electromagnetic energy to be reflected from bodies in the path of the transmitted pulse energy and for receiving the reflected pulses, means for cyclically moving said antenna through a predetermined vertical angle with respect to the flight vector of the aircraft and at a rate considerably less than the repetition rate of said pulses, means to generate a signal indicative of the vertical scan angle of the antenna, means responsive to said signal indicative of the vertical scan angle to divide the vertical scan profile of said antenna into at least an upper sector, a lower sector and a middle sector, said middle sector being contiguous with said upper and lower sectors, means for producing a first electrical signal of a predetermined character when a reflected pulse signal is received by said antenna from at least one object at any point in said upper sector, means for producing a second electrical signal of different predetermined character when no reflected pulse signals are received by said antenna from objects in said upper sector and said middle sector and a reflected pulse signal is received by said antenna from at least one object at any point in said lower sector, means for producing a third electrical signal of a third predetermined character when a reflected pulse signal is received by said antenna from at least one object at any point in said middle sector and no reflected pulse signal is received by said antenna from an object in said upper sector, and stabilization means effective responsive to a change in the angle between the flight vector and a horizontal line for displacing the normal alignment of said antenna relative to said flight vector proportional to the rate of said change in the angle.

11. A terrain avoidance radar system according to claim 10 wherein said stabilization means comprises a rate gyroscope positioned to measure rate of change of the flight vector, an antenna pitch servo coupled to said antenna, means connecting said rate gyroscope to the input of said antenna pitch servo, said antenna pitch servo being effective to displace the normal alignment of the antenna scan relative to the flight vector an amount proportional to the rate of change of the flight vector as indicated by the output of the rate gyroscope.

12. A terrain avoidance radar system aircraft comprising an antenna for transmitting at a predetermined repetition rate pulses of electromagnetic energy to be reflected from bodies in the path of the transmitted pulse energy and for receiving the reflected pulses, means for cyclically moving said antenna through a predetermined vertical angle with respect to the flight vector of the aircraft and at a rate considerably less than the repetition rate of said pulses, the vertical scan profile of said antenna being divided into at least an upper sector, a middle sector and a lower sector, a high "$g$" climb channel for passing signals received from said upper sector, a low "$g$" climb channel for passing signals received from said middle sector, a dive channel for passing signals received from said lower sector, means for applying signals indicative of reflected pulses to each of said channels, means for applying a first antenna derived signal to said high "$g$" climb channel while said antenna is scanning said upper sector only, means for applying a second antenna derived signal to said low "$g$" climb channel while said antenna is scanning said middle sector only, means for applying a third antenna derived signal to said dive channel while said antenna is scanning said lower sector only, means for producing a first electrical signal when a reflected pulse signal is presented to said high "$g$" climb channel while said first antenna derived signal is applied to it, means for producing a second electrical signal when a reflected pulse signal is presented to said low "$g$" climb channel while said second antenna derived signal is applied to it, and means for producing a third electrical signal when a reflected pulse signal is presented to said dive channel while said third antenna derived signal is applied to it.

13. A terrain avoidance radar system for aircraft comprising an antenna for transmitting at a predetermined repetition rate pulses of electromagnetic energy to be reflected from bodies in the path of the transmitted pulse energy and for receiving the reflected pulses, means for cyclically moving said antenna through a predetermined vertical angle with respect to the flight vector of the aircraft and at a rate considerably less than the repetition rate of said pulses, means to generate a signal indicative of the vertical scan angle of the antenna, means responsive to said signal indicative of the vertical scan angle which defines the vertical scan profile of said antenna by a first line extending from said aircraft at a predetermined angle above the flight vector of said aircraft, an arc intersecting said first line and being disposed arcuately toward said flight vector a given distance ahead of said aircraft, a second line disposed at a relatively small angle with respect to the flight vector of said aircraft and intersecting said arc at a point slightly above said flight vector, said second line intersecting the ground a predetermined distance in front of said aircraft, a third line extending from said aircraft at a predetermined angle below said flight vector and intersecting the ground, and a fourth line along the ground joining the points where said second and third lines intersect the ground, means for producing a first electrical signal when a reflected pulse signal is received by said antenna from an object within said scan profile, and means for producing a second electrical signal when a reflected pulse signal is received by said antenna from an object outside said scan profile and no reflected pulse signal is received by said antenna from an object within said scan profile.

14. A terrain avoidance radar system for aircraft that comprises an antenna for transmitting at a predetermined repetition rate pulses of electromagnetic energy to be reflected from bodies in the path of the transmitted pulse energy and for receiving the reflected pulses, means for cyclically moving said antenna through a predetermined vertical angle with respect to the flight vector of the aircraft and at a substantially constant angular velocity, the scan rate of said antenna being considerably less than the repetition rate of said pulses, means effective responsive to said antenna receiving pulses reflected from an object at any point within a predetermined vertical scan profile for producing a first signal of predetermined character, said scan profile being bounded on one side by a line which slopes upward and forward at an angle to the flight vector of the aircraft, the distance from said aircraft to any point on said line varying as a function of the angular position of the point with respect to said aircraft, means responsive to said antenna only receiving pulses during one-half scan which are reflected from an object not within said predetermined vertical scan profile and below a predetermined line for producing a second signal of different predetermined character.

15. A terrain avoidance radar system as defined in claim 14 further including means effective responsive to a change in angle between the flight vector and horizontal line for displacing the normal alignment of said antenna relative to said flight vector proportionally to the rate of said change in the angle.

16. A terrain avoidance radar system as defined in claim 14 wherein said second named means is effective responsive to said antenna receiving pulses reflected from an object at any point within a first sector of said vertical scan profile for producing said first signal and is effective responsive to said antenna receiving pulses reflected from an object at any point within a second sector of said vertical scan profile for producing a third signal of a third predetermined character.

17. A terrain avoidance radar system as defined in claim 16 further including means connected to receive said first signal, said second signal, and said third signal and indicating malfunction of the system in the absence of all of said first, second, or third signals.

18. A terrain avoidance radar system as defined in claim 17 further including control means for controlling the pitch of said aircraft, means for applying said first, second and third signals to said control means, said control means being effective responsive to the presence of said first signal to cause said aircraft to climb at a preset first rate, effective responsive to the presence of said second signal to dive at a preset rate of descent and effective responsive to the presence of said third signal and the absence of said first signal to climb at a preset second rate less than said preset first rate.

References Cited

UNITED STATES PATENTS

| | | | |
|---|---|---|---|
| 2,965,894 | 12/1960 | Sweeney | 343—7 |
| 2,998,598 | 8/1961 | Braun et al. | 343—7 |

RODNEY D. BENNETT, Primary Examiner

T. H. TUBBESING, Assistant Examiner